United States Patent [19]

Kordomenos et al.

[11] Patent Number: 4,714,744

[45] Date of Patent: Dec. 22, 1987

[54] EPOXY-POLYESTER GRAFT COPOLYMERS SUITABLE FOR CHIP RESISTANT COATING COMPOSITION I

[75] Inventors: Panagiotis I. Kordomenos, Mt. Clemens; Andrew H. Dervan, Grosse Pointe Farms, both of Mich.

[73] Assignee: E. I. Du Pont de Nemours and Company, Wilmington, Del.

[21] Appl. No.: 877,908

[22] Filed: Jun. 23, 1986

[51] Int. Cl.$^4$ .................... C08G 59/16; C08G 63/18; C08G 63/20
[52] U.S. Cl. ............................ 525/438; 525/533
[58] Field of Search .................... 525/438, 437, 533

[56] References Cited

U.S. PATENT DOCUMENTS

| | | | |
|---|---|---|---|
| 2,890,208 | 6/1959 | Young et al. | 528/357 |
| 3,763,079 | 10/1973 | Fryd | 525/440 |
| 3,882,189 | 5/1975 | Hudak | 525/520 |
| 3,954,899 | 5/1976 | Chang et al. | 525/520 |
| 3,962,369 | 6/1976 | Chang et al. | 525/518 |
| 3,962,522 | 6/1976 | Chang et al. | 525/418 |
| 4,017,456 | 4/1977 | Tucker et al. | 525/440 |
| 4,034,017 | 7/1977 | Chang et al. | 525/440 |
| 4,205,115 | 5/1980 | Piccirilli et al. | 524/538 |
| 4,208,495 | 6/1980 | Chang et al. | 525/440 |
| 4,436,878 | 3/1984 | Batzill et al. | 525/438 |
| 4,522,984 | 6/1985 | Watanabe et al. | 525/415 |
| 4,533,704 | 8/1985 | Alexander et al. | 525/440 |
| 4,554,332 | 11/1985 | Kordomenos et al. | 525/532 |
| 4,574,146 | 3/1986 | Kordomenos et al. | 525/530 |
| 4,581,424 | 4/1986 | Kordomenos et al. | 525/533 |

*Primary Examiner*—John C. Bleutge
*Assistant Examiner*—Robert E. L. Sellers, II
*Attorney, Agent, or Firm*—Hilmar L. Fricke

[57] ABSTRACT

A hydroxy functional epoxy-polyester graft copolymer and novel, solvent-based thermosetting coating composition comprising said copolymer and polyfunctional, hydroxy-reactive crosslinking agent. The coating composition may be formulated as a hot sprayable, high solids coating composition suitable for use as a chip resistant automotive vehicle primer adapted for use on body panel areas subject to chipping by stones, gravel and other road debris. The composition may also be formulated as a high solids composition sprayable with conventional spraying equipment. Hydroxy-functional epoxy-polyester graft copolymer is prepared by polymerization of lactone monomers in the presence of hydroxy functional epoxy ester resin precursor. The precursor is the reaction product of modified diepoxide and hydroxy functional secondary amine in about a 1:1 equivalent ratio. The modified diepoxide is the reaction product of polymerization of lactone monomers in the presence of diepoxide which has been reacted substantially simultaneously with diphenol and dicarboxylic acid.

10 Claims, No Drawings

EPOXY-POLYESTER GRAFT COPOLYMERS SUITABLE FOR CHIP RESISTANT COATING COMPOSITION I

Reference is made to concurrently filed and commonly assigned related U.S. applications Ser. No. 877,639 filed June 23, 1986 entitled "Chip Resistant Coating Composition I" and Ser. No. 877,645 filed June 23, 1986 entitled "Chip Resistant Coating Composition I'", both to Kordomenos et al.

TECHNICAL FIELD

This invention relates to a novel hydroxy functional epoxy-polyester graft copolymer and to a solvent-based, thermosetting coating composition comprising such copolymer and polyfunctional, hydroxy-reactive crosslinking agent. It relates also to such coating composition formulated, for example, as a hot sprayable, high solids coating composition suitable for use as a chip resistant automotive vehicle primer adapted for use on body panel areas subject to chipping by stones, gravel and other road debris.

BACKGROUND

Automobile manufacturers, in their efforts to extend the expected life of automobile sheet metal and the like, have directed considerable attention to various processes and compositions designed to result in not only improved corrosion resistance but also improved chip resistance properties. In particular, research and development efforts have recently been directed to obtaining primer compositions which are flexible and chip resistant and which give corrosion protection while exhibiting good humidity and solvent resistance, as well as good intercoat adhesion. New automobile designs and concern about chipping in areas exposed to stones, gravel and other road debris, e.g. rocker panels, have demanded such chip resistant primers which can be applied in reasonable thicknesses by techniques which do not require extensive and expensive processing modifications during painting operations. To date available primers, whether high or low solids, have not proven particularly suitable.

In order to overcome the aforementioned chipping problem it has been common to apply relatively thick chip resistant coatings in body panel regions, which are inclined to chip, prior to application of still another primer composition. One such chip resistant sealer material which has been employed is a polyvinyl chloride plastisol sealer which has been applied with airless spraygun equipment in thicknesses of about 20 mils in regions subject to high levels of chipping. Problems attendant with such thick coatings are readily apparent. Because of the thickness in the region to which it is applied, these materials present an appearance problem often resulting in waviness and roughness in the final coating on the sheet metal. Often times surface imperfections also result from the fact that a primer is applied over the top of this sealer, with the primer and sealer being cured together. As a result some solvent and plasticizer tend to be driven out of the polyvinyl chloride plastisol and result in a wavy and rough surface. Still further problems associated with the use of such polyvinyl chloride plastisol sealers and the like involve application technique. Since the polyvinyl chloride plastisol sealers and the like must be applied in thicknesses of 20 mils or greater in order to obtain good adhesion, they cannot be feathered down to blend in with other regions of the sheet metal which do not require the additional chip protection. Thus, the materials must be applied using a masking technique whereby those regions which are not to be coated with the sealer material are masked in a separated operation prior to application of sealer. This masking is then removed after the sealer is applied. It would obviously be desirable to eliminate these additional steps in the application of the chip resistant sealer material.

Accordingly, it is a preferred object of this invention to provide a novel solvent based, thermosetting coating composition adapted for use as a chip resistant primer, which primer may be applied in thicknesses of less than 20 mils and which may be feathered in such a manner as to blend with paint in other areas of the substrate to be painted which do not require chip resistant coating.

It is a further object of the present invention to provide novel resins suitable for use in solvent-based thermosetting coating compositions. In this regard, it is a particular object of the invention to provide novel, hydroxy functional epoxy-polyester graft copolymer resins which are crosslinkable during cure, on the surface of a substrate.

It is another object of the invention to provide novel coating compositions which comprise crosslinkable hydroxy functional epoxy-polyester graft copolymers and crosslinking agent and which provide high crosslinking efficiency and tough, well cured films at minimum bake temperatures such as when applied as automotive primers. In this regard, it is a particular object of the invention to provide a novel hydroxy functional epoxy-polyester/crosslinking agent thermosetting coating composition of sufficiently low Volatile Organic Content (VOC) to aid in meeting governmental emissions guidelines and yet which can be applied to a substrate by spraying or other known method.

It is another object of the invention to provide a composition which will form a coating on a substrate, which coating has advantageous physical properties including, for example, humidity and solvent resistance, flexibility and corrosion protection for the underlying substrate.

Additional aspects and advantages of the invention will be apparent from the following description thereof.

DISCLOSURE OF THE INVENTION

According to the present invention, novel crosslinkable hydroxy functional epoxy-polyester graft copolymer resins are provided which are suitable for use in thermosetting coating compositions, and which are especially advantageous for use in high solids and chip resistant, organic solvent based thermosetting coating compositions. The hydroxy functional epoxy-polyester graft copolymer resins of the invention preferably have a number average molecular weight ($\overline{Mn}$) of about 2,000 to about 20,000 and are the product of polymerization of lactone monomers in the presence of hydroxy functional epoxy ester resin precursor, wherein the polymerization reaction mixture comprises between about 10 and about 80 weight percent of the hydroxy functional epoxy ester resin precursor and between about 90 and about 20 weight percent lactone monomers. The precursor is the reaction product of: (i) modified diepoxide being the product of polymerization of lactone monomers in the presence of diepoxide which has been reacted substantially simultaneously with diphenol and dicarboxylic acid, and (ii) hydroxy functional secondary amine in chain termination reaction in about a 1:1 equivalent ratio. The diepoxide is reacted substantially simultaneously with diphenol and dicarboxylic acid in amounts sufficient to give a weight per epoxide (WPE) of between about 500 and about 2,500, preferably between about 500 and about 1,500. Preferably the diphenol and dicarboxylic acid are employed in a ratio of 10/90 to 90/10 by weight. The lactone monomers reacted to form the modified diepoxide and the combined diphenol and dicarboxylic acid are employed in a molar ratio of at least 2:1, respectively.

Also according to the present invention, a novel, organic solvent based, thermosetting resin/crosslinking agent composition, in addition to solvent and any pigments and additives such as, for example, catalyst, flow control agents and the like, comprises the hydroxy functional epoxy-polyester graft copolymer resin of the invention and polyfunctional, hydroxy-reactive crosslinking agent. Preferably, such crosslinking agent is selected from (1) aminoplast crosslinking agent such as, for example, hexamethoxy methyl melamine, (2) blocked polyisocyanate crosslinking agent including, but not limited to, blocked trifunctional isocyanurate ring containing polyisocyanates and oligoester modified blocked isocyanates, and (3) a compatible mixture of any of them.

Particularly preferred compositions of the invention are those formulated as high solids coating compositions having solids levels in the range of 65-80% solids and which are applied as chip resistant primers in those areas of automotive panels, such as rocker panels, which are exposed to high levels of chipping. Such compositions may be applied in thicknesses ranging from 1 to 25 mils wet to obtain final coatings in the range of 1 to 12 mils dry, and may be feathered down to blend in with paint applied to regions outside that requiring additional chip resistance protection. Generally, the compositions of this solids level may be applied using hot spray equipment at temperatures in the range of room temperature is about 77° C. to about 160° F.

Other preferred compositions of the invention are those formulated as high solids coating compositions adapted to be applied by conventional spraying onto a substrate. These high solids coating compositions may have a solids level in the range of 50-60% and are especially useful as a primer coating on the bare, unpolished metal surface of an automotive vehicle. As used herein, a high solids coating composition is one having a volatile organic content of about 479 g/l (4.0 lb./gal.) or less.

Other features and advantages of this invention will become more apparent from the following, detailed description thereof including the preferred embodiments and best mode of carrying out this invention.

DETAILED DESCRIPTION OF THE INVENTION

More specifically, the invention relates to a novel hydroxy functional epoxy-polyester graft copolymer suitable for use in a thermosetting composition and to a thermosetting composition comprising that hydroxy functional graft copolymer and a polyfunctional, hydroxy-reactive crosslinking agent.

The novel, epoxy-polyester graft copolymer preferably has a number average molecular weight ($\overline{Mn}$) of between about 2,000 and about 20,000 and is the product of polymerization of lactone monomers in the presence of hydroxy functional epoxy ester resin precursor, wherein the polymerization reaction mixture preferably comprises between about 10 and about 80 weight percent hydroxy functional epoxy ester resin precursor and between about 90 and about 20 weight percent lactone monomers. Preferably, the polymerization reaction mixture comprises between about 35 and about 65 weight percent hydroxy functional epoxy ester resin precursor and between about 65 and about 35 weight percent lactone monomers. The hydroxy functional epoxy ester resin precursor is the reaction product of: (i) modified diepoxide and (ii) hydroxy functional secondary amine in chain termination reaction in about 1:1 equivalent ratio (i.e., of epoxide to amine groups). The modified diepoxide itself is the product of polymerization of lactone monomers in the presence of diepoxide which has been chain extended substantially simultaneously with diphenol and dicarboxylic acid, wherein the lactone monomers reacted to form the modified diepoxide and the combined diphenol and dicarboxylic acid are employed in a molar ratio of at least about 2:1, respectively. The diphenol and dicarboxylic acid are reacted substantially simultaneously with diepoxide in amounts sufficient to give a weight per epoxide (WPE) of between about 500 and about 2,500, preferably between about 500 and about 1,500. Preferably the diphenol and dicarboxylic acid are employed in a ratio of 10/90 to 90/10 by weight. The polymerization of lactone monomers with the precursor and the polymerization of the lactone monomers with the chain extended diepoxide is generally coarried out at a temperature between about 50° C. and about 300° C., preferably at a temperature of between about 130° C. and about 200° C.

Thermosetting compositions of the invention comprise the above hydroxy functional graft copolymer and polyfunctional, hydroxy-reactive crosslinking agent. Each of the above major components of the compositions as well as other components and other aspects of the inventions are described hereinafter in greater detail.

A. Hydroxy Functional Epoxy-Polyester Graft Copolymer

As described above, this copolymer is the product of polymerization of lactone monomer in the presence of an hydroxy functional epoxy ester resin precursor which itself is the reaction product of modified diepoxide and hydroxy functional secondary amine in chain termination reaction. The modified diepoxide itself is the product of lactone monomers in the presence of diepoxide which has been chain extended substantially simultaneously with diphenol and dicarboxylic acid.

It is believed to be a significant characterizing aspect of the hydroxy functional epoxy-polyester graft copolymer of the invention that the polymerized lactone portion of the hydroxy functional epoxy-polyester graft copolymer gives the copolymer flexibility as well as toughness, two key properties when choosing a primer for use in areas susceptible to chipping. It is a further characterizing aspect of the copolymer that it includes epoxy resin portions, i.e. hydroxy terminated epoxy ester resin precursor is used as an initiator to form the graft copolymer, which give the copolymer excellent corrosion resistance properties. Still further, because the graft copolymers of the invention are branched, they require a minimum amount of crosslinking in order to obtain a suitable network for good coating integrity.

Preferred hydroxy functional epoxy-polyester graft copolymers of the invention include significant aromatic content which is believed to enhance corrosion resistance properties. Even though aromatics tend to increase the brittleness of polymers and compositions including such polymers, it is possible to include them since, as mentioned above, the polymerized lactone portion of the hydroxy functional epoxy-polyester graft copolymer gives the polymer increased flexibility which, in preferred embodiments, more than compensates for any such brittleness. A particularly preferred embodiment of the hydroxy functional epoxy-polyester graft copolymer resin of the invention is prepared from aromatic containing diepoxide. Also, as discussed hereafter, the dicarboxylic acid reactant employed in preparation of the hydroxy functional epoxy-ester resin precursor may also include aromatic units.

Each of the reactants employed in the preparation of the hydroxy functional epoxy-polyester graft copolymer is described in greater detail below.

(i) Diepoxide Reactant

While, ultimately, the choice of the diepoxide reactant for preparing the hydroxy functional epoxy ester resin precursor will depend to an extent upon the particular application intended for the coating composition, terminal diepoxides, that is diepoxides bearing two terminal epoxide groups, are generally most preferred. These are generally more reactive and therefore require reaction conditions under which undesirable side reactions, for example, epoxy-epoxy reactions and gellation, can be more easily avoided. The diepoxides which are to be chain extended with the diphenol and dicarboxylic acid may be selected from numerous diepoxides, some of which may be diphenol extended diepoxides.

Diepoxy resins not previously extended with diphenol also may be used in the preparation of the hydroxy function epoxy ester resin precursor. Preferred diepoxy resins of this type include: Epon 828 (trademark) and Epon 829 (trademark), which are non-extended diepoxides of the Epon (trademark) Series, Shell Chemical Co., Houston, Tex., as well as cycloaliphatic diepoxy resins, such as the Eponex (trademark) series, Shell Chemical Company; hydantoin epoxy resins such as, for example, Resin XB2793 (trademark, Ciba-Geigy Corporation, Ardsley, New York); and any of a wide variety of acyclic or cyclic aliphatic diepoxides such as, for example, 1,4-butanediol diglycidyl ether and 4-vinylcyclohexene dioxide and the like. Still other suitable diepoxides which may be chain extended with dicarboxylic acid and used in synthesizing the epoxy-ester resin precursor are commercially available and will be apparent to the skilled of the art in view of the present disclosure.

Diepoxides previously extended with diphenol may be used in forming the precursor and numerous such materials are commercially available. These include certain of the well known bisphenol-A epichlorohydrin epoxy resins of the aforementioned Epon (trademark) series, e.g. Epon 1000 and Epon 1004 and the DER (trademark) series, Dow Chemical Company, Midland, Mich., e.g., DER 332. These diglycidyl ether bisphenol-A resins, or higher molecular weight analogs thereof, are most preferred in view of their cost and commercial availability.

Also, it will be understood from the foregoing that any mixture of compatible diepoxides may be used.

In addition to the diepoxide, a portion of the epoxy functionality can be provided by any compatible monoepoxy compound or polyepoxy compound or mixture of such compounds. The polyepoxide can be any of the well known types such as polyglycidyl ethers of polyphenols. These can be produced by etherification of polyphenol with epihalohydrin in the presence of alkali. It will be recognized by the skilled of the art in view of the present disclosure, that in some instances, particularly where a coating composition of high solids content is less important, it may be desirable to incorporate polyepoxide of higher molecular weight. Preferably, any such polyepoxide contains free hydroxyl groups in addition to epoxide groups.

While polyglycidyl ethers of polyphenol can be employed, it may be desirable to react a portion of the reactive sites (hydroxyl or in some instances epoxy) with a modifying material to vary the film characteristics of the resin. The epoxy resin may be modified, for example, with isocyanate group containing organic materials or other reactive organic materials.

Other useful polyepoxides are the novolak resins including, for example, the novolak epoxy resins ECN 1235 (trademark) and ECN 1273 (trademark), Ciba-Geigy Corporation.

According to preferred embodiments of the present invention, epoxide compounds other than diepoxide compounds provide no more than about 15% and most preferably substantially none of the total epoxide functionality in the reactants used to form the epoxy-ester resin precursor.

(ii) Diphenol Reactant

The diphenol reactants suitable for reaction with the diepoxide reactant and dicarboxylic acid in chain extension reaction include numerous commercially available materials, many of which will be readily apparent to the skilled of the art in view of the present disclosure. Preferred diphenols have the general formula (I):

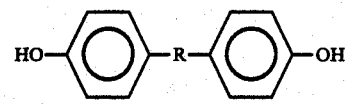

(I)

wherein R is a divalent linking moiety substantially unreactive with the diepoxide resin. Preferably R is a divalent organic linking moiety, for example $(CH_2)_n$ where n is preferably from about 1 to about 8, $C=O$, and the like, although inorganic moieties, for example sulfonyl and the like, are also suitable. Diphenols of this character have been found to provide good reactivity with diepoxides described above and to provide, ultimately, cured coatings of the invention having excellent physical properties, most notably excellent corrosion protection. It will be apparent to the skilled of the art in view of the present disclosure that R should be substantially unreactive with the acid component employed in preparation of the epoxy ester resin precursor. Particularly preferred diphenols include those according to formula (I) above, wherein R is selected from the group comprising a straight or branched alkylene or alkylidene moiety of one to about 10 carbons, preferably having three to four carbons and most preferably having the general formula:

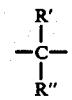

wherein R' and R" are the same or different and each is a monovalent organic moiety preferably selected from the group comprising hydrogen and lower alkyl of about one to four carbons, most preferably one or two carbons, and the like or a mixture of any of them. Preferably the diphenol has a number average molecular weight ($\overline{M}_n$) between about 180 and about 500, more preferably between about 180 and about 250. Such diphenols include, for example bisphenol-A, which is most preferred, bisphenol-B, bisphenol-F and a compatible mixture of any of them. As used herein the term diphenol may include, for example, compounds comprising a single dihydroxy substituted phenyl ring such as benzenediol. More preferred, however, are those diphenols providing two terminal, mono-hydroxy substituted phenyl rings such as in formula (I), above. Other examples of diphenols are bis-(4-hydroxy-tert-butylphenyl)2,2-propane, bis-(hydroxy-naphthyl)-methane and 1,5-dihydroxynaphthalene. Other suitable diphenols useful to form the epoxy ester resin of the present invention will be apparent to the skilled of the art in view of the present disclosure.

(iii) Dicarboxylic Acid Reactant

Dicarboxylic acids suitable for chain extending diepoxides discussed above preferably have a number average molecular weight of between about 145 and about 1000 and more preferably between about 400 and about 600. Suitable dicarboxylic acids include numerous commercially available materials, many of which will be readily apparent to the skilled of the art in view of the present disclosure. Suitable dicarboxylic acids include saturated or unsaturated, cyclic or acyclic, aliphatic or aromatic dicarboxylic acids or a mixture thereof. Acyclic aliphatic dicarboxylic acids are generally preferred in view of the enhanced flexibility they provide to the cured coatings of the invention. Preferred dicarboxylic acids have the general formula (II):

HOOC—R'"—COOH  (II)

wherein R is a divalent linking moiety substantially unreactive with the diepoxide resin. It will be apparent to the skilled of the art in view of the present disclosure, that R'" should be substantially unreactive also with the acid component employed in preparation of the epoxy ester resin precursor, and with hydroxy functionality (generated in the chain-extension reaction). Preferably R'" is a divalent, organic, linking moiety. Particularly preferred are those dicarboxylic acids wherein R'" is selected from the group comprising a straight or branched alkylene or alkylidene moiety, preferably of about 4-42 carbons, for example, $(CH_2)_n$ wherein n is preferably from about 4 to about 42, and the like or a mixture thereof. Dicarboxylic acids of this character have been found to provide good reactivity with the preferred diepoxides described above and to provide, ultimately, cured coatings of the invention having excellent physical properties, most notably excellent flexibility and corrosion protection.

Exemplary dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid, and the like or a compatible mixture of any of them. The anhydrides of these acids, where the anhydrides exist, are, of course, embraced in the term "acid" since the reaction products obtained therefrom are the same. While dicarboxylic acids according to formula (II) can be used wherein R'" is an alkylene chain of less than 4 carbons, for example, oxalic acid, malonic acid, succinic acid, glutaric acid and the like, these are less preferred in view of the somewhat lesser degree of flexibility provided thereby. Preferably the dicarboxylic acid provides two terminal carboxyl groups. Similarly, preferred aromatic dicarboxylic acids are those wherein the carboxylic groups are more spaced apart, for example, 1,4-benzenedicarboxylic acid and 2,7-naphthalenedicarboxylic acid.

The most preferred dicarboxylic acids are substantially saturated, acyclic, aliphatic dimer acids, which are well known to the skilled of the art and readily commercially available. These are typically the dimerization reaction products of fatty acids which have from 4 to 22 carbons and a terminal carboxyl group. Of these, dimer acid of 36 carbons is most preferred since it provides excellent reactivity with the preferred diepoxides described above, provides epoxy ester reaction products of advantageously wide molecular weight distribution, and provides, ultimately, cured coatings of the invention having excellent physical properties. In addition, dimer acid of 36 carbons is readily commercially available, for example, as Empol 1014 (trademark), Empol 1016 (trademark) and Empol 1018 (trademark), each available from Emery industries, Inc., Cincinnati, Ohio. It should be recognized that most or all commercially available dimer acids contain some portion of trimer acid, typically, for example, about 5–10% but in some cases as much as 30% or more, and also contain a usually smaller portion of monocarboxylic acid. As used herein, the term "dimer acid" includes those containing such amounts of these materials. Most useful is the present compositions are products that contain mostly dibasic acid and none or low amounts of tribasic and monobasic acids.

Aliphatic dicarboxylic acids are seen to provide additional advantages. In particular, while not wishing to be bound by theory, it is presently understood that epoxy-polyester resin graft copolymers prepared from epoxy ester resin precursors derived therefrom wet the substrate surface better and provide enhanced adhesion between the substrate and the cured coating. They also flow better and, thus, provide an excellent smooth surface upon being cured. Also, the aliphatic units provide enhanced flexibility to the cured coating, as noted above, and this flexibility of the coating is seen to provide enhanced impact resistance, a feature even more highly desirable for chip resistant coating embodiments.

Where corrosion protection for the substrate is important, it may be preferred to employ dicarboxylic acid according to formula (II) above wherein R'" is, at least in part, aromatic. As noted above, it is believed that such aromatics in the coating composition of the invention, such as a primer composition for a metal substrate, are more resistant to hydrolysis than are aliphatics and, therefore, provide enhanced corrosion and moisture resistance. Of course, as also noted above, according to preferred embodiments of the epoxy ester resin precursor, described above, the diepoxide reactant provides aromatic units to the resin and this would similarly contribute to corrosion and moisture resistance.

Other suitable dicarboxylic acids for the epoxy ester resin of the present invention will be apparent to the skilled of the art in view of the present disclosure.

Preferably, the chain extended diepoxide has a number average molecular weight ($\overline{M}_n$) between about 1,200 and about 3,500, and more preferably between about 1,600 and about 2,400.

(iv) Lactone Monomers

The lactone reactant may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as a reactant can be represented by the general formula:

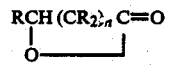

in which n is at least four, for example, from four to six, at least n+2R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula:

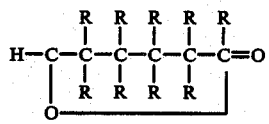

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6-hydroxyhexanoic acid and is most preferred. Substituted epsilon-caprolactones, and mixtures thereof, are available by reacting a corresponding substituted cyclohexanone with an oxidizing agent such as peracetic acid.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monodecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not distributed; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enatholactone and eta-caprylolactone may also be polymerized in accordance with the method of the invention.

(v) Hydroxy Functional Secondary Amine Reactant

The hydroxy functional secondary amine which is reacted in chain terminating reaction with the modified diepoxide may be selected from a broad class of aliphatic, cycloaliphatic and aromatic hydroxy functional amines.

Numerous such amines, which may bear mono- or dihydroxy functionality will be apparent to those skilled in the art in view of the present invention disclosure. Exemplary of such amines are those having the formula (II):

wherein R and R' are selected from the group consisting of aliphatic, cycloaliphatic and aromatic radicals which will not interfere with the chain termination reaction between the chain extended diepoxide and the hydroxy functional secondary amine. R and R' in the above formula may be the same or different, but preferably should be of the same nature. X may be selected from hydrogen and hydroxyl radical.

While the hydroxyl group on R and/or R' may be other than primary, primary hydroxyls are preferred since such primary hydroxyl groups are more reactive (i.e., they react faster) with the crosslinking agent of the composition during curing.

Examples of preferred radicals R and R' for the hydroxy functional amine of the above formula (II) are:

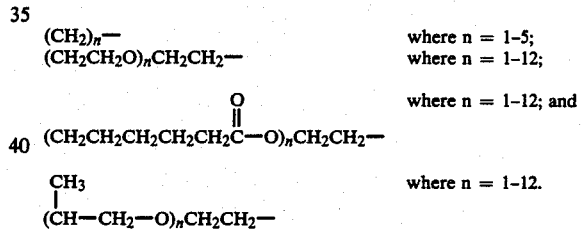

Preferably R and R' are methylene, ethylene, or lower alkylene groups but they may be any other noninterfering radical including those, for example, such as benzyl, oxyalkylene, etc.

Particularly preferred primary hydroxyl bearing amines for use in preparing the hydroxy functional epoxy ester resin precursor are diethanol amine, methylethanol amine, dipropanol amine, and methylpropanol amine.

The modified diepoxide used to initiate lactone polymerization in the preparation of the epoxy ester resin precursor of the invention can be made according to techniques well known to the skilled of the art. The chain extension of the diepoxide, where necessary, is carried out first by changing diepoxide and diphenol into a suitable reactor and heating the mixture. The reactants are used in relative proportions to yield a chain extension reaction product bearing two unreacted epoxide groups and preferably substantially no unreacted phenol functionality. Suitable separation techniques are known to the skilled of the art for removal of unused reactants. It should be recognized that to assure rapid and/or more complete reaction of the diepoxide with the phenol and carboxyl functionality, it is usually preferred to have a catalyst present. The use of catalyst has been found to provide advantageous epoxy ester resin of the invention and is preferred. Epon 829 (trademark), mentioned above, as sold, provides a proprietary catalyst. Epon 828 (trademark), is substantially the same but does not provide such catalyst. Suitable catalysts are commercially available and include, any of the well known catalysts for epoxy-phenol and epoxy-dicarboxyl reactions such as, for example, sodium carbonate, ethyltriphenyl phosphonium iodide, lithium neodecanoate and other organo metallic catalysts and tertiary amines, such as benzyl dimethylamine. Other suitable catalysts will be apparent to those skilled in the art in view of the present disclosure.

The reaction mixture is heated to at least about 140° C. (250° F.). When in the presence of catalyst, an exothermic reaction will proceed with or without further heating. Typically, the reaction mixture will then read about 149° C.-176° C. (300° F.-350° F.), depending upon the batch size and reactor vessel insulation, etc. In the absence of catalyst, such exotherm is typically not observed and continued heating is required. The progress of the reaction can be followed by measuring acid number measurements or weight per epoxide (WPE), i.e., epoxide equivalent weight.

An noted above, the diepoxide is reacted substantially simultaneously with diphenol and dicarboxylic acid in amounts sufficient to give a weight per epoxide (WPE) of between about 500 and about 2,500, preferably between about 500 and about 1,500. Preferably, the acid and diphenol reacted with the diepoxide are employed in a ratio of from about 10:90 to about 90:10.

After completion of the chain extension of the diepoxide, lactone monomers are polymerized in the presence of the chain extended diepoxide to form the modified diepoxide. The lactone monomers and the combined diphenol and dicarboxylic acid are employed in a molar ratio of at least about 2:1, respectively. Polymerization of the lactones in accordance with this invention is carried out in conventional manner in that the polymerization is initiated by reaction with a compound having at least one reactive hydrogen capable, with or without the aid of a catalyst, of opening the lactone ring and adding it as an open chain without forming water of condensation—in this instance the initiator compound being the chain extended diepoxide described above.

To initiate and continue the polymerization of the lactone, the lactone and the initiator (i.e., the diphenol chain extended diepoxide) are preferably heated to a temperature between about 130° and 200° C. in order to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50° to 300° C. is considered operable and a more limited range between about 130° and 200° C. is considered preferable.

The polymerization may be, and preferably is, carried out with the use of a catalyst, such as a basic or neutral ester interchange catalyst, to accelerate the reaction. Among catalysts suitable for this purpose are such metals as lithium, sodium, potassium, rubidium, cesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

After formation of the modified epoxide, the hydroxy functional secondary amine reactant is charged into the reaction vessel to form the hydroxy functional epoxy ester resin precursor. This reaction is exothermic and drives itself to completion. As noted above, the modified diepoxide is reacted with hydroxy functional secondary amine in chain terminating reaction in approximately 1 to 1 equivalent ratio, i.e., approximately 1 to 1 equivalent ratio of epoxide groups to amine groups. This ratio is desirable since excess epoxy could result in gelation of the reaction mixture, while excess amine remaining in the reaction mixture could compete with lactone monomers during formation of the epoxy-polyester graft copolymer. For this reason, if excess amine is used during formation of the precursor, it should preferably be removed prior to reaction of the precursor with lactone monomers.

Lactone monomers are subsequently polymerized in the presence of the hydroxy functional epoxy ester resin precursor, wherein the polymerization reaction mixture comprises between about 10 and about 80 weight percent of the aforementioned precursor and between about 90 and about 20 weight percent lactone monomers. The polymerization of the lactone monomers is carried out in a conventional manner as described above for polymerization of lactone monomers in the presence of the chain extended diepoxide. In this instance, however, the initiator compound being the hydroxy functional epoxy ester resin precursor described above. The lactones, temperature conditions, and catalysts described above for lactone polymerization in the presence of the chain extended diepoxide are also suitable for the polymerization of lactone monomers in the presence of the precursor.

The hydroxy functional epoxy polyester graft polymerization products obtained in accordance with the invention have molecular weights generally upwards of about 2,000 and preferably within the range of about 4,000 to about 20,000, although molecular weights below and substantially above this range are obtainable if desired. They also have reactive terminal hydroxyl or carboxyl groups, the number of reactive terminal groups depending upon the functionality of the initiator, the initiator in this invention being the chain extended diepoxide and the hydroxy functional epoxy ester resin precursor. They are characterized by the presence of series of interconnected, substantially linear units or groups composed of carbon, hydrogen and oxygen. The interconnected units are opened lactone residures each having a terminal oxy group at one end, a carbonyl group at the other end, an intermediate chain of at least five carbon atoms and at least one hydrogen substituent on the carbon atom in the intermediate chain that is attached to the terminal oxy group. The oxy group of one lactone residue is connected to the carbonyl group of an adjacent lactone residue in the series and the oxy group of the last lactone residue in a series is connected to a hydrogen to form a terminal hydroxyl group at one end of the series.

B. Crosslinking Agent

The crosslinking agent employed in the novel solvent based coating compositions of the invention comprises polyfunctional, hydroxy-reactive crosslinking agent selected, preferably, from aminoplast crosslinking agents and blocked polyisocyanate crosslinking agents. Exemplary of the types of aminoplast crosslinking agents and blocked polyisocyanate crosslinking agents which may be employed in this invention are those disclosed in U.S. Pat. No. 4,476,625 issued Oct. 9, 1984 to Kordomenos, the disclosure of which is hereby expressly incorporated by reference for such teachings, in particular column 8, line 15 to column 13, line 50.

(a) Blocked Polyisocyanate Crosslinking Agent

Those embodiments of solvent based coating compositions of the invention employed blocked polyisocyanate crosslinking agents exhibit exceptional shelf stability even when corrosion inhibiting pigments such as zinc chromate are used in high concentrations.

As used herein "blocked polyisocyanate" means an isocyanate compound containing two or more isocyanate groups, all of which have been reacted with a material which will prevent reaction of the isocyanate group at room temperature with compounds that conventionally react with such groups, and at least some of which will permit that reaction to occur at higher (cure) temperatures. In general the blocked polyisocyanate may be prepared by reacting a sufficient quantity of an active hydrogen containing blocking agent with the polyisocyanate to insure that no free isocyanate groups are present. The blocking agent may be represented by the formula BH and may be selected from numerous materials, hereinafter discussed, which bear an active hydrogen.

The proper proportion of blocked polyisocyanate crosslinking agent to graft copolymer will depend, in part, upon the properties desired in the coating to be produced and, in part, upon the desired cure response of the coating composition (which will depend, in turn, upon the baking schedule to be used in curing the coating composition) and, in part, upon the desired storage stability of the composition, that is, upon the desired shelf life. Accordingly, the amounts of crosslinker that can be used with the epoxy ester resin varies considerably. Preferably the blocked polyisocyanate crosslinking agent is included in compositions of the invention in amounts such that upon deblocking of the blocked isocyanate groups at the cure temperature of the composition, the crosslinking agent will provide between about 0.5 and about 1.6, preferably between about 0.8 and about 1.3, reactive isocyanate groups per hydroxyl group on the film forming graft copolymer of the coating composition as described above. Numerous types of blocked polyisocyanates are well known to those of the art which may be suitably used in this invention. Selection o such blocked polyisocyanates for use in this invention would be apparent to those of the art in view of the present disclosure. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates, all of which are described in detail in U.S. Pat. No. 4,5476,259 to Kordomenos referenced above.

In the preparation of the blocked polyisocyanate crosslinking agent, any suitable organic polyisocyanate may be used. Representative examples are the aliphatic compounds, the cycloalkylene compounds, the aromatic compounds, substituted aromatic compounds, triisocyanates, tetraisocyanates, and polymerized polyisocyanates.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; trimethylolpropane, pentaerythritol, and the like, as well as mono-ethers such as diethylene glycol, tripropylene glycol and the like and polyethers, i.e., alkylene oxide condensates of the above.

A particular class of aromatic polyisocyanates which may be employed in the novel solvent based coating compositions of the invention are polymethylene polyphenol isocyanates having the formula:

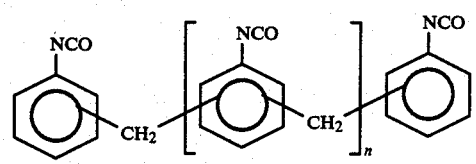

wherein n equals 1 to 3. Such compounds, sold under the tradename "PAPI" by the Upjohn Chemical Company of Kalamazoo, Mich., have proven to be particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Representative of those blocking agents which are preferred are those selected from the group consisting of (i) aliphatic, cycloaliphatic and aromatic alkyl monoalcohols; (ii) hydroxyl amines; (iii) oximes; (iv) lactams; and (v) triazoles.

(i) Isocyanurate Ring Containing Blocked Isocyanate Compounds

In general, these blocked polyisocyanates may be formed by blocking isocyanurate ring containing polyisocyanates with the aforementioned blocking agent. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particular desirable blocked polyisocyanate crosslinking agent is the blocked form the of pure trifunctional isocyanurate represented by the following formula:

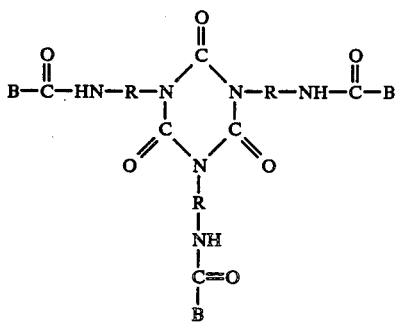

wherein R is selected from the group consisting of aliphatic, cycloaliphatic and aromatic groups and combinations thereof and B is the residue of an active hydrogen containing blocking agent. More specifically, this compound is disclosed in U.S. Pat. No. 4,491,633, the disclosure of which is incorporated herein by reference.

(ii) Oligoester Modified Blocked Polyisocyanates

Still further, particular blocked polyisocyanates useful as crosslinking agents in the solvent based coating composition of this invention are oligoester modified blocked polyisocyanates prepared from a particular class of oligoester diols and triols. A first type of such oligoester modified blocked polyisocyanates is prepared from organic diisocyanates bearing one isocyanate group more reactive than the other, with the more reactive isocyanate first being blocked with a blocking agent and the remaining isocyanate group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanate terminated prepolymer followed by blocking of the terminal isocyanate groups of the prepolymer with an active hydrogen containing blocking agent. Each of these materials is particularly useful in the compositions of the invention and produces final cured coating compositions exhibiting outstanding flexibility.

Oligoesters of the type employed in the preparation of these crosslinking agents are described in U.S. Pat. No. 4,322,508 issued Mar. 30, 1982, the disclosure of which is hereby incorporated by reference. The hydroxy functional oligoesters within the useful class of materials (i) have a number average molecular weight ($\overline{Mn}$) between about 150 and about 3000, preferably between about 230 and about 1000, (ii) bear 2 or 3 hydroxyl groups per molecule, and (iii) are formed by an esterification reaction between a carboxylic acid and an epoxide.

(b) Amino Crosslinking Agent

According to alternative embodiments of the invention, the novel solvent based coating compositions employ hydroxy-reactive polyfunctional aminoplast crosslinking agents. It will be recognized that compatible combinations of suitable polyfunctional aminoplast crosslinking agent(s) and blocked polyisocyanate crosslinking agent(s) also can be used. Included within the aminoplast crosslinking agents suitable for use in the coating composition are numerous materials which are well known to the skilled of the art including, for example, alkylate melamine formaldehyde resins with one to about eight carbon atoms in the alkyl moiety. Other suitable aminoplast crosslinking agents will be apparent to the skilled of the art in view of the present disclosure. Many such crosslinking agents are readily commercially available including, for example, the Resimene (trademark) series available for Monsanto Company, St. Louis, Mo., the most preferred being Resimene 717 (trademark), described as a low temperature cure methylated melamineformaldehyde resin.

In addition, suitable polyfunctional aminoplast crosslinking agents can be prepared employing conventional techniques. Accordingly, for example, a lower alkanol such as methanol, ethanol, butanol, isobutanol, isopropanol, hexanol, 2-ethylhexanol or the like or a mixture of any of them is reacted with a melamine formaldehye. Preferred crosslinking agents of this type include butylated melamine formaldehyde resin, methylated/-butylated formaldehyde resin and polyalkyl hexamethoxymethyl melamine resin is most preferred in view of its relatively lower cost ready commercial availability, its low reactivity with the film forming graft copolymer of the invention at elevated cure temperatures. In this regard, preferred polyfunctional aminoplast crosslinking agent is substantially unreactive with the graft copolymer at or below about 60° C. Other suitable aminoplast crosslinking agents will be apparent to the skilled of the art in view of the present disclosure.

The proper proportion of polyfunctional aminoplast crosslinking agent to graft copolymer will depend, in part, upon the properties desired in the coating to be produced and, in part, upon the desired cure response of the coating composition (which will depend, in turn upon the baking schedule intended for curing the coating composition) and, in part, upon the desired storage stability of the coating composition, that is, upon the desired shelf life. Accordingly, the amounts of graft copolymer that can be blended with the crosslinker to form coating compositions of the invention may be varied considerably. Preferably, the aminoplast crosslinking agent is used in amounts of about 5% to about 40% by weight of the total resin solids, more preferably about 20% to about 30%.

C. General Discussion—Other Aspects of Invention and Other Components

The coating compositions of the invention have been found to provide a cured coating having the advantageous physical properties described above, over a wide range of cure temperatures and a wide range of solids levels. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper volatile organic content for a given coating composition of the invention and for a given application. Preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellusolve acetate, acetone and a mixture of any of them. Other solvents which may be employed include terpenes, aliphatic and aromatic naphthas, and the like. Additional suitable solvents are commerically available and will be apparent to the skilled of the art in view of the present disclosure.

Any solvent allowed to remain in the cured coating should be inert so as to avoid adverse effect upon the cured coating or upon another coating layer used in conjunction with it during the curing process or thereafter. Preferrably, the cured coating is substantially free of solvent.

Sufficient solvent is used to reduce the viscosity of the coating composition to a level suitable for application to the substrate in the desired manner.

Obviously, in those cases where the composition is to be applied as a chip resistant primer the amount of solvent will be reduced so as to give a solids level of about 65–80%. Such higher solids materials are generally applied using hot spray equipment.

Flow control agent(s), for example, polybutyl acrylate; wetting agent(s), for example, silicone; pigments; pigment disperants; corrosion inhibitors, for example, chromate pigments, numerous of all of which are known to the skilled of the art, may be employed in the coating compositions of the invention. In addition, suitable reactive additives can be used, including, for example, low molecular weight diol flow control agents and reactive diluents.

Compositions of the invention, and in particular the chip resistant primers of the invention, may also include anti-settling or anti-sagging agents to control the thixotropic properties of the composition. Exemplary of available materials suitable for this purpose are Dislon (trademark) 6900-20X manufactured by Kusumoto Chemicals, Ltd., Tokyo, Japan and sold by King Industries, Norwalk, CT. 06852; Bentone (trademark) 38, N. L. Industries, Highstown, N.J. 08520; and Cab-O-Sil (trademark) M-5, Cabot Corporation, Boston, Mass.

Curing the coating composition requires baking for sufficient time at sufficiently elevated temperature to react the crosslinking agent with the hydroxyl functionally of the hydroxy functional epoxy-polyester graft copolymer. The time and temperature required to cure the coating are interrelated and depend upon the particular hydroxy functional epoxy-polyester resin, crosslinking agent, solvent and other materials, if any, and the amount of each comprising the coating composition. The coating compositions according to preferred embodiments of the invention, as described above, have been found to provide the best coating results when cured at temperature at about 150° C. (300° F.) for 20 minutes. It is a highly significant advantage of the invention, however, that these same coating compositions can withstand, for example, temperature as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shut-downs are recovered with cured and unharmed coatings.

High solids coating compositions according to the present invention, comprising the novel crosslinkable hydroxy functional epoxy-polyester graft copolymer resins of the invention, especially the preferred resins described above and blocked polyisocyanate crosslinking agent, especially the preferred materials described above, have been found to afford cured coatings with improved corrosion resistance and chip resistance, thus representing a highly advantageous advance in the art.

A most preferred use of the coating composition of the invention is as a high solid hot sprayable chip resistant primer for use on a bare metal substrate such as for an automotive vehicle body which is subject to chipping. Primer compositions typically are pigmented and any pigments commonly included in primer compositions for metal substrates and acrylic dispersion topcoats such as, for example, carbon black, iron oxide, lithopone, magnesium, silicate, silica, barium sulfate, TiO2, chrome yellow, calcium chromate, strontium, chromate, zinc potassium chromate any the like may be used. The primer can be pigmented according to known methods including, for example, by grinding pigments in a portion of the curable resin and adding to the primer composition.

The pigment-to-binder ratio of the chip resistant primer may be from about 0.5:1 to about 2:1 by weight, respectively; it is preferred, however, to use a primer having a pigment-to-binder ratio of from about 1:1 to about 1.5:1 by weight, respectively.

In preferred embodiments of this invention pigments and thixotropic agents desireably are dispersed with epoxy ester resins which do not have an elastomeric component as does the hydroxy functional epoxy-polyester graft copolymer employed as the primary film forming resin of the compositions. It has been found that in addition to being very effectice dispersing agents for the preparation of pigment millbases and thixotropic dispersions, non-elastomeric epoxies give the compositions toughness. One type of epoxy useful for this purpose comprises the reaction product of diepoxide, dimer acid and a mixture of Soya fatty acid and propionic acid (See Example 6). Ofther epoxy ester resins useful for this purpose are those disclosed in U.S. application Ser. Nos. 448,886 filed June 14, 1982 (abandoned), 431,465 filed Sept. 30, 1982 (abandoned) and in U.S. Pat. No. 4,491,641, all assigned to the assignee of this application. These resins comprise the simultaneous reaction product of diepoxide with (i) diphenol, dicarboxylic acid or a mixture of them in chain extension reaction and (ii) fatty acid in chain terminating esterification reaction. Still other suitable epoxy resins useful for dispersing pigment and thixotropic agents will be apparent to the skilled of the art in view of the present disclosure.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, hot sprayable, automotive vehicle chip resistant primer, the solvent will comprise preferably about 20 to about 40 percent by weight of the total coating compositions, although of course, larger or smaller amounts may be utilized depending upon the solids content desired.

The primer is generally maintained at about 65 to about 80 percent solids content for hot spraying purposes with conventional thinners such as aromatic hydrocarbons, commercial petroleum cuts which are essentially aromatic, and the like, and sprayed onto the metal base or other substrate and cured. The primer may be applied in greater thickness of 1 to 25 mils wet, preferably 10 to 25 mils wet, in order to obtain final coatings in the desired range of 5-11 mils in regions highly susceptible to chipping and is then feathered down in thickness to the thickness of paints in areas not receiving a chip resistant primer. The primer is cured at elevated temperatures by any convenient means such as baking ovens or banks of infra-red heat lamps. Curing temperatures are preferably from about 135° C. to about 165° C., although curing temperature from about 100° C. to about 230° C. may be employed, if desired.

The invention will be further understood by referring to the following detailed examples. It should be understood that the specific examples are presented by way of illustration and not by way of limitation. Unless otherwise specified, all references to "parts" are intended to mean parts by weight.

EXAMPLE 1

Preparation of Epoxy-Polyester Graft Copolymer

Into a suitable reactor were charged 392 parts Epon 829 (trademark), Shell Chemical Co., diepoxide, 46 parts bisphenol A, 70 parts dodecanedioic acid and 220 parts Solvessor 150. The temperature of this mixture was brought up to about 150°-160° C. After one hour the acid number was found to be 1.5. 186 parts of epsilon-caprolactone and 0.2 parts of dibutyl tin oxide was added to the mixture and the temperature was kept at 160° C. for one hour. 104 parts diethanolamine was added to the mixture. After one hour at 150° C., 434 parts of epsilon-caprolactone and 1 part of dibutyl tin oxide was charged. The temperature was raised to about 160° C. for two hours. At this point heating was terminated and 310 parts M-pyrol was added. The resulting resin had a Y viscosity at 70% solids.

EXAMPLE 2

Preparation of Epoxy-Polyester Graft Copolymer

Into a suitable reactor were charged 294 parts Epon 829 (trademark, Shell Chemical Co., diepoxide), 46 parts bisphenol A, 172 parts Empol 1016 (trademark, Emery Ind., Inc., dimer acid) and 220 parts Solvesso 150. The temperature of the mixture was brought up to 150°-160° C. After one hour at this temperature, the acid number was found to be 1.8. 169 parts of epsilon-caprolactone and 0.2 parts of dibutyl tin oxide were added to the mixture and the temperature was kept at 160° C. for two hours. It was then cooled to 130° C. and 52 parts diethanolamine are added to the mixture. After one hour at 150° C., 395 parts epsilon-caprolactone and 1 part of dibutyl tin oxide were charged. The temperature was raised to about 160° C. and maintained for two hours. At this point heating was terminated and 265 parts M-pyrol were added and the mixture was allowed to cool. The resin had a Z viscosity at 70% solids.

EXAMPLE 3

Preparation of Epoxy-Polyester Graft Copolymer

Into a suitable reactor are charged 530 parts Epon 829 (trademark, Shell Chemical Co., diepoxide), 46 parts bisphenol-A and 230 parts Empol 1016 (trademark, Emery Ind., Inc., dimer acid) and 320 parts Solvesso 150. The temperature of the mixture is brought up to 160° C. After one hour at this temperature, the acid number is found to be zero. 330 parts of epsilon-caprolactone and 0.1 parts of dibutyl tin oxide are added to the mixture and the temperature is kept at 160° C. for two hours. It is then cooled to 130° C. and 46.5 parts N-methylethanolamine are added to the mixture and the temperature is raised to about 150° C. After one hour 680 parts epsilon-caprolactone and 1 parts of dibutyl tin oxide are added to the mixture and the temperature is raised to 160° C. At this point, heating is terminated and 400 parts M-pyrol are added and the mixture is allowed to cool. The resin has a viscosity of $Z_5$ at 70% solids.

EXAMPLE 4

Preparation of Epoxy-Polyester Graft Copolymer

Into a suitable reactor are charged 519 parts of Epon 829 (trademark, Shell Chemical Co., diepoxide), 101 parts of bisphenol A, 254 parts of Empol 1016 (trademark, Emery Ind., Inc., dimer acid) and 235 parts Solvesso 100. The temperature of the mixture is brought up to about 160° C. After one hour at this temperature, the acid number is found to be zero. 470 parts of epsilon-caprolactone and 0.2 parts dibutyl tin oxide are added and the temperature is kept at 160° C. for two hours. It is then cooled to 130° C. and 69 parts N-methylethanolamine are added and the temperature is raised to about 150° C. After one hour, 944 parts epsilon-caprolactone and 2 parts dibutyl tin oxide are added to the mixture and the temperature is raised to 160° C. and maintained for one hour. At this point heating is terminated and 755 parts M-pyrol are added and the mixture is allowed to cool. The resin has a $Z_3$ viscosity at 70% solids.

EXAMPLE 5

Preparation of Epoxy-Polyester Graft Copolymer

Into a suitable reactor are charged 350 parts Epon 829 (trademark, Shell Chemical Co., diepoxide), 56 parts of azelaic acid, 68 parts bisphenol A and 200 parts Solvesso 100. The temperature of the mixture is brought up to about 160° C.; after one hour at this temperature, the acid number is found to be zero. 396 parts of epsilon-caprolactone and 0.2 parts of dibutyl tin oxide are added and the temperature is kept at 160° C. for two hours. It is then cooled to 130° C. and 60 parts of Solvesso 100 and 46.5 parts of N-methylethanolamine are added to the mixture and the temperature is raised to about 150° C. After one hour 793 parts of epsilon-caprolactone and 2 parts of dibutyl tin oxide are added to the mixture and the temperature is raised to 160° C. and maintained for one hour. At this point heating is discontinued and 480 parts of M-pyrol are added. The resin has a Z viscosity at 70% solids.

EXAMPLE 6

Preparation of Epoxy Ester Dispersing Resin

Into a suitable reactor were charged 1280 parts Epon 829 (trademark, Shell Chemical Co., diepoxide), 954 parts Empol 1016 (trademark, Emery Industries, dimer acid), 364 parts Soya fatty acid, 268 parts 2,2 bis(hydroxymethyl)propionic acid, and 13 parts lithium neodeconoate. The temperature of the mixture was brought up to about 180° C., at which point an exothermic reaction took place that raised the temperature to about 200° C. After one hour, the acid number was found to be less than 2. 240 parts Solvesso 100 and 305 parts Solvesso 150 were added, and the mixture was cooled. The resin had a viscosity of $Z_7$ at 70% solids.

EXAMPLE 7

Preparation of Blocked Polyisocyanate Crosslinking Agent

Into a suitable reactor were charged 537 parts methylethyl ketoxime. 784 parts PAPI 94 (trademark, Up-John Chemical Co., aromatic polyisocyanate) was added dropwise over two hours; the reaction temperature rose from room temperature to 80° C.-95° C. The temperature of the mixture was maintained at 85° C.-95° C. for one hour. After 30 minutes, the mixture was checked to insure complete reaction of isocyanate by infrared. At that point, 300 parts methylamyl ketone and 150 parts M-pyrol were added and the mixture was cooled. The resulting resin was dark brown and and was 75% solids.

EXAMPLE 8

Preparation of Blocked Polyisocyanate Crosslinking Agent

Into a suitable reactor are charged 870 parts methylethyl ketoxime and 180 parts Solvesso 100. 1330 parts of PAPI 27 (trademark, UpJohn Chemical Co., aromatic polyisocyanate) is added dropwise to the mixture over two hours; the reaction temperature rose from room temperature to 85° C.-95° C. 39 parts 2-ethylhexanol is added to the mixture and the temperature of the mixture is maintained at 85° C.-95° C. for one hour. At that point, 816 parts of M-pyrol are added and the mixture is cooled. The resulting resin is dark brown and has a viscosity of 6000 cps at 75.0% solids.

EXAMPLES 9-12

Preparation of Blocked Polyisocyanate Crosslinking Agent

Blocked isocyanate crosslinkers according to the invention were prepared in the manner of Example 8. The components employed are shown in the table below.

| Composition | Example 9 | 10 | 11 | 12 |
|---|---|---|---|---|
| | Parts | | | |
| L-2991 A* | 360 | 360 | 360 | — |
| Desmodur IL* | | | | 525 |
| methylethyl ketoxime | 174 | | | 87 |
| benzotriazole | | 238 | | |
| epsilon-caprolactam | | | 227 | |
| N—methyl pyrolidone | 133 | 150 | 195 | 461 |
| % solids | 80 | 80.1 | 75.1 | 57 |
| Viscosity | $Z_1$ | $Z_6$ | $Z_2$ | $Z$ |

*Trademarks of Mobay Chemical Co.; L-2291 A is a biurette of hexamethylene diisocyanate; Desmodur IL is a polyisocyanurate of tolylene diisocyanate.

EXAMPLE 13

Millbase Preparation

In a one gallon can or ballmill were charged the following materials and one quart of diagonal shot. The mixture was placed on a roller mill for 16-24 hours to reach a 7+ hegman dispersion. At that point, the letdown was added, and the mixture was run an additional hour on the roller mill.

| | |
|---|---|
| Hi-Sol #3* | 585 |
| 2-Ethyl Hexanol | 95 |
| Polyethylene Wax | 70 |
| Anti-Terra-U** | 40 |
| Resin of Example 6 | 103 |
| Barytes | 2259 |
| TiO$_2$ | 429 |
| Carbon Black | 29 |
| Strontium Chromate | 143 |
| Letdown: Resin of Example 6 | 247 |

*Trademark of Ashland Chemical Co., Columbus, Ohio; Hi-Sol #3 is an aromatic solvent.
**Trademark of Byk Mallinckrodt, Wallingford, CT 06492; Anti-Terra-U is an antisettling and wetting agent.

EXAMPLE 14

Bentone Gel Preparation:
To a clean Ball Mill, charge the following:

| | Parts |
|---|---|
| Solvesso 150 | 513 |
| Propylene Carbonate | 13 |
| Bentone 38 | 30 |
| Grind 30 minutes, then add: | 384 |
| Resin of Example 6 | |
| Grind approximately 2 Hrs. to 8 Hegman. | 60 |
| Letdown with: | |
| Hi-Sol #3 | |
| | 1000 |

EXAMPLES 15-20

Coating compositions of the invention are formulated as shown in Table A. The coating compositions are prepared by sequential mixing in a 5 gallon working capacity EMCO Proto-Lab SW Mill (trademark), Epworth Mfg. Co., South Haven, Mich., set at 900 rpm. Resin and Dislon (trademark) are first mixed for approximately 10 minutes and then millbase, Bentone gel and crosslinker are added sequentially while mixing. Finally Cab-O-Sil (trademark) is added and the composition mixed until a gring of 6+ on the Hegman Scale was obtained.

The above compositions are sprayed at 60°-70° C. using hot-spray equipment commercially available from Nordson Corp. Unpolished Bonderite steel panels are sprayed and baked at 135° C. for 20 minutes. The thickness of the cured coating tested varied from 5 mils to 12 mils. The panels are top-coated with white enamel and tested for chip resistance using 10 pts. of gravel in the gravelometer test. In addition, panels are tested for corrosion resistance (500 hrs. salt spray test, scribed panels) and humidity resistance.

TABLE A

| Composition | 15 | 16 | 17 | 18 | 19 | 20 |
|---|---|---|---|---|---|---|
| | | | Parts | | | |
| Resin of Example 1 | 2635 | | | | | |
| Resin of Example 2 | | 2284 | 2284 | | | |
| Resin of Example 3 | | | | 2241 | | |
| Resin of Example 4 | | | | | 2141 | |
| Resin of Example 5 | | | | | | 2015 |
| Millbase of Example 13 | 5788 | 5788 | 5788 | 5788 | 5788 | 5788 |
| Bentone Gel of Example 14 | 2315 | 2315 | 2315 | 2315 | 2315 | 2315 |
| Crosslinker of Example 7 | 984 | 984 | | 984 | 984 | 984 |
| Crosslinker of Example 8 | | | 1050 | | | |
| Dislon* | 114 | 114 | 120 | 120 | | 120 |

TABLE A-continued

| Composition | Example | | | | | |
|---|---|---|---|---|---|---|
| | 15 | 16 | 17 | 18 | 19 | 20 |
| | Parts | | | | | |
| Cab-O-Sil** | 142 | 142 | | | | |

*Trademark Kusumoto Chemicals, Ltd., Dislon is an anti-sagging agent
**Trademark of Cabot Corp., Boston, Mass., Cab-O-Sil is a foamed silica (anti-settling agent).

EXAMPLES 21-24

Additional coating compositions according to the invention are shown in Table B.

TABLE B

| Composition | Example | | | |
|---|---|---|---|---|
| | 21 | 22 | 23 | 24 |
| Resin of Example 4 | 2141 | 2141 | 2141 | 2141 |
| Millbase of Example 13 | 5788 | 5788 | 5788 | 5788 |
| Gel of ExamPle 14 | 2315 | 2315 | 2315 | 2315 |
| Crosslinker of Example 9 | 922 | | | |
| Crosslinker of Example 10 | | 922 | | |
| Crosslinker of Example 11 | | | 984 | |
| Crosslinker of Example 12 | | | | 1294 |
| Dislon* | 100 | 100 | 100 | 100 |

*Trademark Kusumoto Chemicals, Ltd., Dislon is an anti-sagging agent.
**Trademark of Cabot Corp., Boston, Mass., Cab-O-Sil is a foamed silica (anti-settling agent).

In view of this disclosure, many modifications of this invention will be apparent to those skilled in the art. It is intended that all such apparent modifications ccll within the true scope of this invention and be included within the terms of the appended claims.

INDUSTRIAL APPLICATION

It will be apparent from the foregoing that this invention has industrial applicability as a coating composition, especially as a hot sprayable, high solids coating composition suitable for use as a chip resistant automotive vehicle primer adapted for use on body panel areas subject to chipping by stones, gravel and other road debris.

What is claimed is:

1. A hydroxy functional epoxy-polyester graft copolymer suitable for use in a thermosetting composition, which copolymer has a number average molecular weight ($M_n$) of between about 2,000 and about 20,000, said copolymer being the product of polymerization of lactone monomers in the presence of hydroxy functional epoxy ester resin precursor having reactive hydroxyl groups, said lactone monomers being polymerized and reacted with hydroxyl groups of the precursor without chain extension of the precursor to form pendent hydroxyl terminated polymer chains, wherein the polymerization reaction mixture comprises between about 10 and about 80 weight percent said hydroxy functional epoxy ester resin precursor and between about 90 and about 20 weight percent said lactone monomers, said precursor being the reaction product of:

(i) modified diepoxide being the product of polymerization of lactone monomers in the presence of diepoxide which has been chain extended substantially simultaneously with diphenol and dicarboxylic acid, said diepoxide being reacted substantially simultaneously with said diphenol and dicarboxylic acid in amounts sufficient to give a weight per epoxide of between about 500 and about 2500, wherein said lactone monomers reacted to form said modified diepoxide and the combined said diphenol and dicarboxylic acid, are employed in a molar ratio of at least about 2:1, respectively; and (ii) hydroxy functional secondary amine in chain termination reaction in about 1:1 equivalent ratio.

2. A hydroxy functional epoxy-polyester graft copolymer in accordance with claim 1, wherein said diepoxide is selected from the group consisting of bisphenol-A epichlorohydrin epoxy resin, hydantoin epoxy resin, cyclic and acylic aliphatic diepoxides and mixtures thereof.

3. A hydroxy functional epoxy-polyester graft copolymer in accordance with claim 1, wherein said diphenol is selected from the group consisting of bisphenol-A, bisphenol B, bisphenol-F and mixtures thereof.

4. A hydroxy functional epoxy-polyester graft copolymer in accordance with claim 1, wherein said dicarboxylic acid is selected from the group consisting of saturated or unsaturated, cyclic or acyclic, aliphatic or aromatic dicarboxylic acids and mixtures thereof.

5. A hydroxy functional epoxy-polyester graft copolymer in accordance with claim 1, wherein said dicarboxylic acid is selected from the group consisting of substantially saturated, acyclic, aliphatic dimer acids of about 4-42 carbons and mixtures thereof.

6. A hydroxy functional epoxy-polyester graft copolymer in accordance with claim 1, wherein said primary hydroxy functional secondary amine has the general formula:

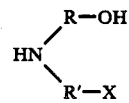

wherein R and R' are selected from aliphatic cycloaliphatic and aromatic radicals which will not interfere with the chain termination reaction of said modified diepoxide and said hydroxy functional secondary amine to form said hydroxy functional epoxy ester resin precursor, and wherein X is selected from the group consisting of hydrogen and hydroxy radical.

7. A hydroxy functional epoxy-polyester graft copolymer in accordance with claim 6, wherein said hydroxy functional secondary amine bears primary hydroxyl functionality.

8. A hydroxy functional epoxy-polyester graft copolymer in accordance with claim 6, wherein said hydroxy functional secondary amine is selected from the group consisting of diethanol amine amine, methylethanol amine, dipropanol amine and methylpropanol amine.

9. A hydroxy functional epoxy-polyester graft copolymer in accordance with claim 1, wherein said lactone monomers are selected from those represented by the general formula:

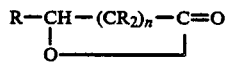

in which n is at least 4, at least n+2 R's are hydrogen, and the remaining R's are substituents selected from the group consisting of alkyl, cycloalkyl, alkoxy and single ring aromatic hydrocarbon radicals.

10. A hydroxy functional epoxy-polyester graft copolymer in accordance with claim 9, wherein said lactone monomers comprise unsubstituted epsilon-caprolactone monomers.

* * * * *